(12) United States Patent
Zhang et al.

(10) Patent No.: US 11,417,030 B2
(45) Date of Patent: Aug. 16, 2022

(54) CONTEXT MODELING OF OCCUPANCY CODING FOR POINT CLOUD CODING

(71) Applicant: TENCENT AMERICA LLC, Palo Alto, CA (US)

(72) Inventors: Xiang Zhang, Palo Alto, CA (US); Wen Gao, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/080,044

(22) Filed: Oct. 26, 2020

(65) Prior Publication Data

US 2021/0256737 A1    Aug. 19, 2021

Related U.S. Application Data

(60) Provisional application No. 62/972,165, filed on Feb. 10, 2020.

(51) Int. Cl.
| | | |
|---|---|---|
| *G06T 9/00* | (2006.01) | |
| *G06T 9/40* | (2006.01) | |
| *G06F 1/03* | (2006.01) | |
| *G06T 7/10* | (2017.01) | |

(52) U.S. Cl.
CPC ............ *G06T 9/40* (2013.01); *G06F 1/03* (2013.01); *G06T 7/10* (2017.01); *G06T 2207/10028* (2013.01)

(58) Field of Classification Search
CPC ........... G06T 7/10–187; G06T 9/00–40; G06T 2207/10028
See application file for complete search history.

(56) References Cited

U.S. PATENT DOCUMENTS

| | | | | |
|---|---|---|---|---|
| 10,693,492 | B1 * | 6/2020 | Lasserre | H03M 7/6011 |
| 2017/0347120 | A1 * | 11/2017 | Chou | H04N 19/147 |
| 2020/0413080 | A1 * | 12/2020 | Lasserre | H04N 19/46 |
| 2020/0413096 | A1 * | 12/2020 | Zhang | H04N 19/597 |
| 2021/0104013 | A1 * | 4/2021 | Hur | G06T 3/40 |
| 2021/0201541 | A1 * | 7/2021 | Lasserre | H04N 19/20 |
| 2021/0209811 | A1 * | 7/2021 | Ramasubramonian | G06T 7/73 |
| 2021/0209813 | A1 * | 7/2021 | Hur | G06T 9/001 |
| 2021/0211734 | A1 * | 7/2021 | Ray | H04N 19/70 |
| 2021/0235058 | A1 * | 7/2021 | Yip | H04N 21/234345 |
| 2021/0248784 | A1 * | 8/2021 | Gao | G06T 9/40 |
| 2021/0256737 | A1 * | 8/2021 | Zhang | G06F 1/03 |

(Continued)

FOREIGN PATENT DOCUMENTS

WO    WO-2021109153 A1 *  6/2021    ............. H04N 19/96

OTHER PUBLICATIONS

Xu et al "Lossless Point Cloud Geometry Compression via Binary Tree partition and intra prediction" IEEE 2017 (Year: 2017).*

(Continued)

*Primary Examiner* — Sean T Motsinger
(74) *Attorney, Agent, or Firm* — Sughrue Mion, PLLC

(57) ABSTRACT

A method for coding information of a point cloud comprises obtaining the point cloud including a set of points in a three-dimensional space; partitioning the point cloud into a plurality of objects and generating occupancy information for each of the plurality of objects; and encoding the occupancy information by taking into account the distance between the plurality of objects.

16 Claims, 8 Drawing Sheets

(56) References Cited

U.S. PATENT DOCUMENTS

| | | | |
|---|---|---|---|
| 2021/0319581 A1* | 10/2021 | Hur | G06T 7/60 |
| 2021/0320962 A1* | 10/2021 | Oh | H04L 65/602 |
| 2021/0327098 A1* | 10/2021 | Ray | H04N 19/13 |
| 2021/0329298 A1* | 10/2021 | Ramasubramonian | H04N 19/70 |
| 2021/0383575 A1* | 12/2021 | Zhang | G06T 9/001 |
| 2021/0385303 A1* | 12/2021 | Ray | H04L 69/04 |

OTHER PUBLICATIONS

Christian Tulvan et al., "Use Cases for Point Cloud Compression (PCC)", ISO/IEC JTC1/SC29/WG11 MPEG2015/M16331, Geneva, CH, Jun. 2016, 8pages.

Rufael Mekuria et al., "Requirements for Point Cloud Compression", ISO/IEC JTC1/SC29/WG11 MPEG2016/N16330, Geneva, CH, Jun. 2016, 3pages.

Khaled Mammou et al., "G-PCC codec description v2", ISO/IEC JTC1/SC29/WG11 N18189, Marrakech, MA, Jan. 2019, 39pages.

"Information technology—MPEG-I (Coded Representation of Immersive Media)—Part 9: Geometry-based Point Cloud Compression", ISO/IEC 23090-9:2019(E), 104pages.

* cited by examiner

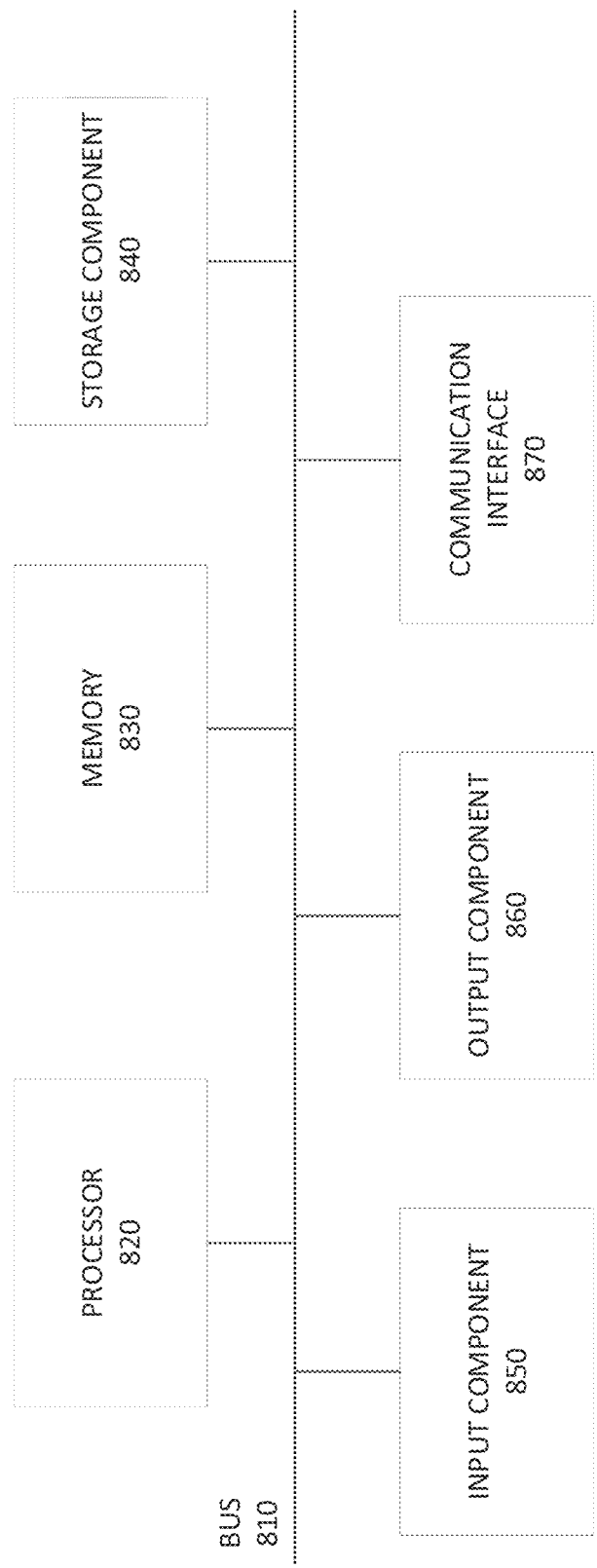

CONTEXT MODELING OF OCCUPANCY CODING FOR POINT CLOUD CODING

CROSS-REFERENCE TO RELATED APPLICATION(S)

This application is based on and claims priority under 35 U.S.C. § 119 to U.S. Provisional Patent Application No. 62/972,165, filed Feb. 10, 2020, in the U.S. Patent & Trademark Office, the disclosure of which is incorporated by reference herein in its entirety.

BACKGROUND

Point cloud modeling has been widely used in recent years. For example, it is used in autonomous driving vehicles for object detection and localization, in geographic information systems (GIS) for mapping, and in cultural heritage projects to visualize and archive cultural heritage objects and collections, etc.

Point clouds contain a set of high dimensional points, typically of three dimensional (3D), each including 3D positional information and additional attributes such as color, reflectance, etc. The high dimensional points can be captured using multiple cameras and depth sensors, via Light Detection and Ranging (LIDAR) in various setups, and may be made up of thousands to billions of points, thereby allowing realistically representations of original scenes.

Compression technologies are needed to reduce the amount of data required to represent a point cloud for faster transmission and/or storage reduction. As explained in Non-Patent Literature 1 and Non-Patent Literature 2, the Moving Picture Experts Group (MPEG), a working group of the International Organization for Standardization (ISO) and the International Electrotechnical Commission (IEC), has created a joint technical committee (JTC 1/SC 29/WG 11) and an ad-hoc group (MPEG-PCC) to standardize compression techniques for static and/or dynamic point clouds.

Non-Patent Literature 1: Use Cases for Point Cloud Compression, ISO/IEC JTC1/SC29 WG11 Doc. N16331, Geneva, CH, June 2016.

Non-Patent Literature 2: Requirements for Point Cloud Compression, ISO/IEC JTC1/SC29 WG11 Doc. N16330, Geneva, CH, June 2016.

SUMMARY

The present disclosure is directed to Point Cloud Coding (PCC). As described herein, context modeling methods of occupancy coding are elaborated on, e.g., for the purpose of point cloud compression.

According to an aspect of the disclosure, a method for coding information of a point cloud may be performed by at least one processor and may comprise: obtaining the point cloud including a set of points in a three-dimensional space; partitioning the point cloud into a plurality of objects and generating occupancy information for each of the plurality of objects; and encoding the occupancy information by taking into account the distance between the plurality of objects.

According to an aspect of the disclosure, the method may be formed such that the encoding of the occupancy information is performed on an object-by-object basis such that a next piece of occupancy information to be encoded is encoded based on a classification of surrounding objects of the plurality of objects, which are classified based on the distance between the plurality of objects.

According to another aspect of the disclosure, the method may be performed such that the occupancy information is encoded using a context index defined by a look-up-table using the formula: LUT{ctxIdx}{ctxIdxChild}, wherein LUT is the look-up-table, ctxIdx is a node of the plurality of objects, and ctxIdxChild is a sub-node of the plurality of objects.

According to another aspect of the disclosure the method may be performed such that the partitioning of the point cloud uses flexible tree partitioning.

According to another aspect of the disclosure, the method may be performed such that the partitioning of the point cloud uses a depth-first partitioning scheme.

According to another aspect of the disclosure, the method may be performed such that the encoding of the occupancy information is performed on an object-by-object basis such that a next piece of occupancy information to be encoded is encoded based on a classification of surrounding objects, of the plurality of objects, which are already encoded, and which are classified based on the distance between the plurality of objects.

According to another aspect of the disclosure, the method may be performed such that the encoding of the occupancy information is performed on an object-by-object basis such that a next piece of occupancy information to be encoded is encoded based on a classification of surrounding objects, of the plurality of objects, at least some of which have been already encoded or partially encoded, and which are classified based on the distance between the plurality of objects.

According to an aspect of the disclosure, an apparatus for coding information of a point cloud may comprise at least one memory configured to store program code; and at least one processor configured to access the at least one memory and operate according to the computer program code; and the computer program code may comprise: obtaining code configured to obtain the point cloud including a set of points in a three-dimensional space; partitioning code configured to partition the point cloud into a plurality of objects and generate occupancy information for each of the plurality of objects; and encoding code configured to encode the occupancy information by taking into account the distance between the plurality of objects.

According to an aspect of the disclosure, the encoding code may be configured to encode the occupancy information on an object-by-object basis such that a next piece of occupancy information to be encoded is encoded based on a classification of surrounding objects of the plurality of objects, which are classified based on the distance between the plurality of objects.

According to another aspect of the disclosure, the encoding code may be configured to encode the occupancy information using a context index defined by a look-up-table using the formula: LUT{ctxIdx}{ctxIdxChild}, wherein LUT is the look-up-table, ctxIdx is a node of the plurality of objects, and ctxIdxChild is a sub-node of the plurality of objects.

According to another aspect of the disclosure, the partitioning code may be configured to partition the point cloud using flexible tree partitioning.

According to another aspect of the disclosure, the partitioning code may be configured to partition the point cloud using a depth-first partitioning scheme.

According to another aspect of the disclosure, the encoding code may be configured to encode the occupancy information on an object-by-object basis such that a next piece of occupancy information to be encoded is encoded based on a classification of surrounding objects, of the plurality of objects, which are already encoded, and which are classified based on the distance between the plurality of objects.

According to an aspect of the disclosure, a non-transitory computer-readable storage medium may be supplied, which stores instructions that cause at least one processor to: obtain the point cloud including a set of points in a three-dimensional space; partition the point cloud into a plurality of objects and generating occupancy information for each of the plurality of objects; and encode the occupancy information by taking into account the distance between the plurality of objects.

BRIEF DESCRIPTION OF THE DRAWINGS

FIG. 8 is a diagram of example components of one or more devices of FIG. 7.

DETAILED DESCRIPTION

Point-Cloud Compression in Test Model 13 (TMC13) in MPEG

As described in Non-Patent Literature 3 and Non-Patent Literature 4, in the Test Model 13 (TMC13) codec, promulgated by the MPEG, geometry information and associated attributes, such as color or reflectance, of points of a point cloud, are separately compressed. The geometry information, e.g., 3D coordinates of the points, is coded by octree-partitioning with occupancy information. The attributes are then compressed based on reconstructed geometry using prediction, lifting and region adaptive hierarchical transform techniques. The octree-partitioning and occupancy encoding processes is described in more detail below.
Non-Patent Literature 3: G-PCC Codec description, ISO/IEC JTC1/SC29/WG11, Doc. N18891, October 2019.
Non-Patent Literature 4: Text of ISO/IEC CD 23090-9 Geometry-based Point Cloud Compression, ISO/IEC JTC1/SC29 WG11 Doc. N18478, Geneva, July 2019.

Octree Partitioning

Figure 1:
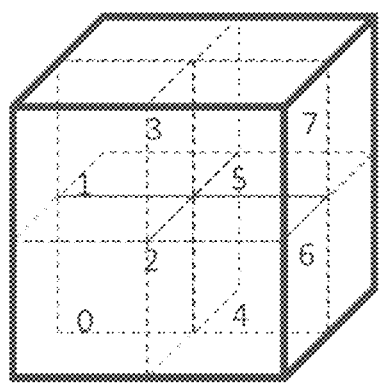
FIG. 1 is an illustration of an octree partition in three-dimensional space.

In TMC13, if an octree geometry codec is used, the geometry encoding proceeds as follows: First, a cubical axis-aligned bounding box B is defined by two points (0,0,0) and $(2^{M-1}, 2^{M-1}, 2^{M-1})$, where $2^{M-1}$ defines the size of B and M is specified in the bitstream. An octree structure is then built by recursively subdividing B. At each stage, a cube is subdivided into 8 sub-cubes. An 8-bit code, namely the occupancy code, is then generated by associating a 1-bit value with each sub-cube in order to indicate whether it contains points (i.e., whether it is full and has value of 1) or not (i.e., whether it is empty and has a value of 0). Only full sub-cubes with a size greater than 1 (i.e., non-voxels) are further subdivided. FIG. 1 presents an illustration of an octree-partition in 3D space.

Figure 2:
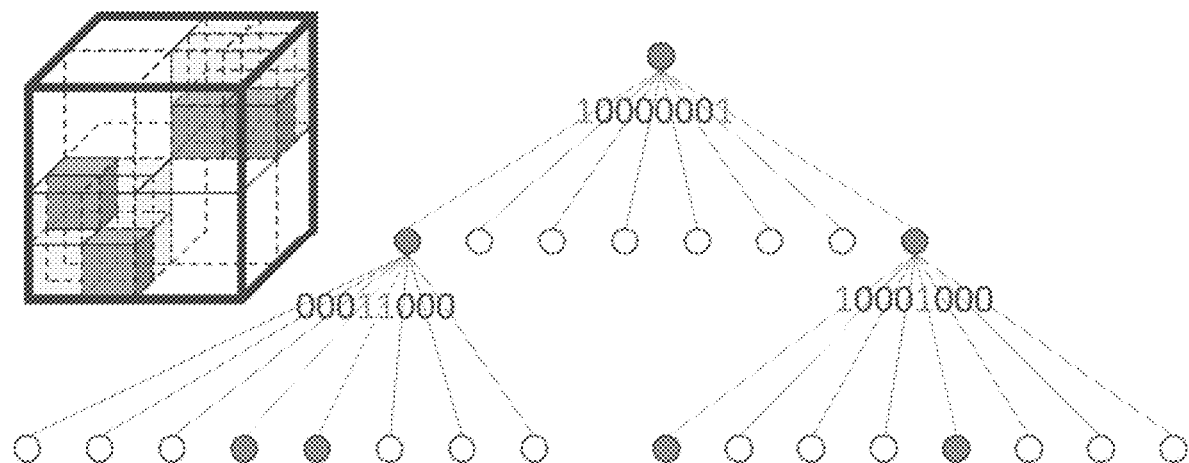
FIG. 2 is an illustration of an octree-partition and tree structure.

An example of two-level octree partition and the corresponding occupancy code are shown in FIG. 2, where cubes and nodes in dark indicate they are occupied by points.

Encoding of Occupancy Code

The occupancy code of each node is then compressed by an arithmetic encoder. The occupancy code can be denoted as S, which is an 8-bit integer, and each bit in S indicates the occupancy status of each child node. Two encoding methods for occupancy code exist in TMC13: bit-wise encoding and byte-wise encoding. Bit-wise encoding is enabled by default. Both methods perform arithmetic coding with context modeling to encode the occupancy code, and the context status is initialized at the beginning of the coding process and is updated during the coding process.

For bit-wise encoding, eight bins in S are encoded in a certain order where each bin is encoded by referring to the occupancy status of neighboring nodes and child nodes of neighboring nodes, where the neighboring nodes are in the same level of a current node.

For byte-wise encoding, S is encoded by referring to:
an adaptive look up table (A-LUT), which keeps track of the N (e.g., 32) most frequent occupancy codes, and
a cache which keeps track of the last different observed M (e.g., 16) occupancy codes.

A binary flag indicating whether S is the A-LUT or not is encoded. If S is in the A-LUT, the index in the A-LUT is encoded by using a binary arithmetic encoder. If S is not in the A-LUT, then a binary flag indicating whether S is in the cache or not is encoded. If S is in the cache, then the binary representation of its index is encoded by using a binary arithmetic encoder. Otherwise, if S is not in the cache, then the binary representation of S is encoded by using a binary arithmetic encoder.

The decoding process starts by parsing dimensions of the bounding box B from the bitstream. The same octree structure is then built by subdividing B according to the decoded occupancy codes.

However, in the codec scheme discussed above, the octree (OT) partition based representation may not be flexible enough for different characteristics of point clouds serving distinct purposes. That is, the compression efficiency may be hindered. The use of quad-tree (QT) and binary-tree (BT), as well as other flexible partitioning schemes have been mentioned in Non-Patent Literature 5, and are discussed below, in relating to point cloud coding. As discussed herein, using only one traversal order (breadth-first or depth-first) of a tree structure may not suitable for all application scenarios.
Non-Patent Literature 5: Implicit Geometry Partition for Point Cloud Coding, US provisional application, 523568US.

Thus, hybrid traversal orders, which are briefly discussed in Non-Patent Literature 6, are disclosed herein are proposed. Context modeling of occupancy coding can be changed to fully utilize neighboring coded nodes. This improves coding efficiency, and accommodates flexible partitioning and traversal orders.
Non-Patent Literature 6: Hybrid Coding Order for Point Cloud Coding, US provisional application, 527115US.

The proposed methods and apparatuses may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium. Further, the disclosures herein are not limited to uses related to TMC13 software or the MPEG-PCC standard.

Binarization of Occupancy Information

According to embodiments, if a node is partitioned into N sub-nodes, an N-bit occupancy code, i.e., $b_{N-1}b_{N-2} \ldots b_0$, is generated where each bit $b_i$ represents if the $i^{th}$ sub-node is occupied or empty. In general, $b_i$ being equal to 1 indicates that the $i^{th}$ sub-node is occupied by at least one point, and $b_i$ being equal to 0 indicate that the $i^{th}$ sub-node is empty.

In another embodiment, $b_i$ being equal to 0 indicates that the $i^{th}$ sub-node is occupied by at least one point, and $b_i$ being equal to 1 indicates that the $i^{th}$ sub-node is empty. For those occupied sub-nodes, the sub-nodes can be further partitioned until reaching the leaf nodes.

According to embodiments, the coding order of the bits in the occupancy code can be defined in an arbitrary order. For an N-bit code, the maximum number of the coding order is $N!=\Pi_1^N i$. To indicate the coding order at different granularities, one can specify it as follows:

- A predefined coding order is applied for all nodes, for all point clouds, in which no extra bit is needed to specify the coding order.
- A specific coding order is applied for a specific point cloud, where the coding order can be specified in the sequence header of the bitstream.
- A specific coding order is applied for each frame of a point cloud, where the coding order can be specified in the frame header of the bitstream.
- A specific coding order is applied for each slice of a point cloud, where the coding order can be specified in the slice header of the bitstream.
- A specific coding order is applied for the nodes of each partition depth of a point cloud, where the coding order can be specified at the beginning of each partition depth. This mode is applicable when the tree structure is traversed by a breadth-first order.
- A specific coding order is applied for a node and all the descendant nodes of this node, where the coding order can be specified before coding this node. This mode is applicable when the tree structure is traversed by a depth-first order.
- A specific coding order is applied for each node of a point cloud, where the coding order can be specified before coding each node.
- A specific coding order is applied for nodes of a point cloud when a certain eligibility condition is satisfied. The coding order can be specified in each partition depth for breadth-first order, or can be specified in the ancestry node for depth-first order, or can be specified in the slice header, frame header or sequence header, or the default coding order can be applied to the rest of nodes in the point cloud that do not satisfy the eligibility condition.

According to embodiments, a preferential coding order can be chosen by selecting the one that consumes the least bits from a group of coding order candidates. An index may be signaled to indicate the specific coding order. This index can be coded by bypassing or entropy coding with updating probability and contexts.

Bypass Coding of Occupancy Code

According to embodiments, the occupancy code can be represented with fewer bits and bypass coding can be applied accordingly.

In an embodiment, if a current node has only one occupied child node, it is acceptable to code the position of the occupied node. A flag is first specified to indicate whether the current node contains only one occupied child node, if so, a 3-bit index is encoded for an octree partition, a 2-bit index is encoded for a quad-tree partition, and a 1-bit index is encoded for a binary-tree partition. Otherwise, the occupancy code of current node is coded as normal. Eligibility of this mode can be determined by the number of occupied neighboring nodes or other conditions; the flag and index are coded only when the mode is eligible. For example, a threshold can be defined. This mode is only applicable if the number of neighboring occupied nodes are smaller than the threshold.

In another embodiment, if a current node has only one unoccupied child node, it is equivalent to code the position of the unoccupied node. A flag may first be specified to indicate whether the current node contains only one unoccupied child node, if so, a 3-bit index is encoded for an octree partition, a 2-bit index is encoded for a quad-tree partition and a 1-bit index is encoded for a binary-tree partition. Otherwise, the occupancy code of the current node is coded as normal. Eligibility of this mode can be determined by the number of occupied neighboring nodes or other conditions; the flag and index are coded when the mode is eligible. For example, a threshold can be defined, this mode is only applicable if the number of neighboring occupied nodes are larger than the threshold.

Context Modeling in Occupancy Coding

According to embodiments all the coded nodes, before coding the current node, can be utilized in the context modeling process of occupancy coding according to the present disclosure. To simplify context modeling, only the coded nodes that are closest to the current node are used. Multiple methods may be used to simplify contexts, as explained herein.

Distance-Based Context Modeling

Figure 3:
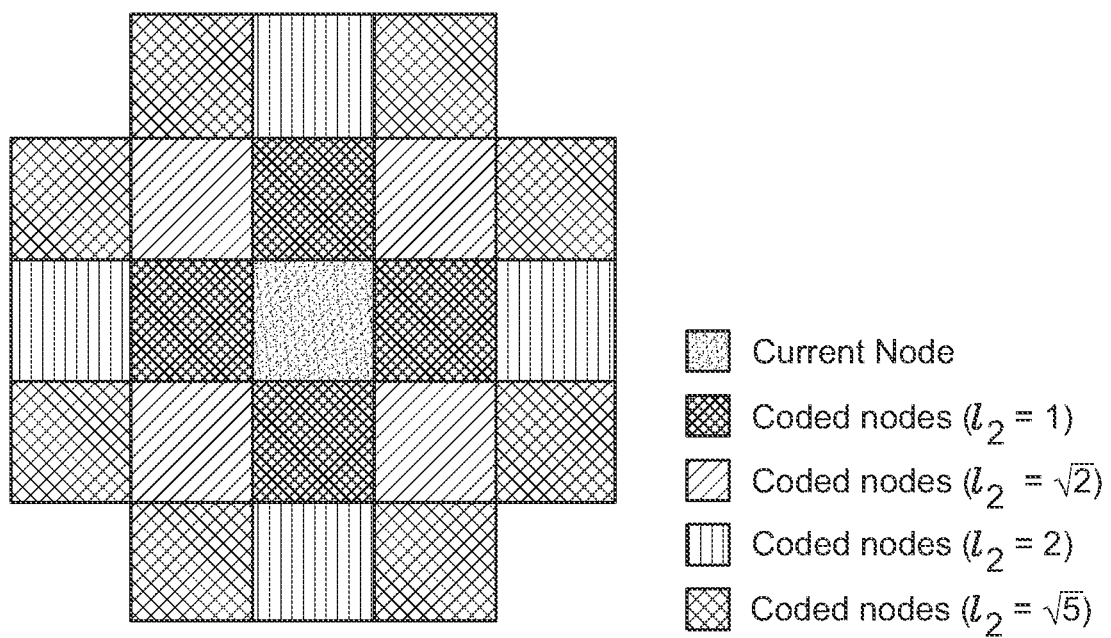
FIG. 3 is an illustration of a classification of neighboring nodes.
Figure 4:
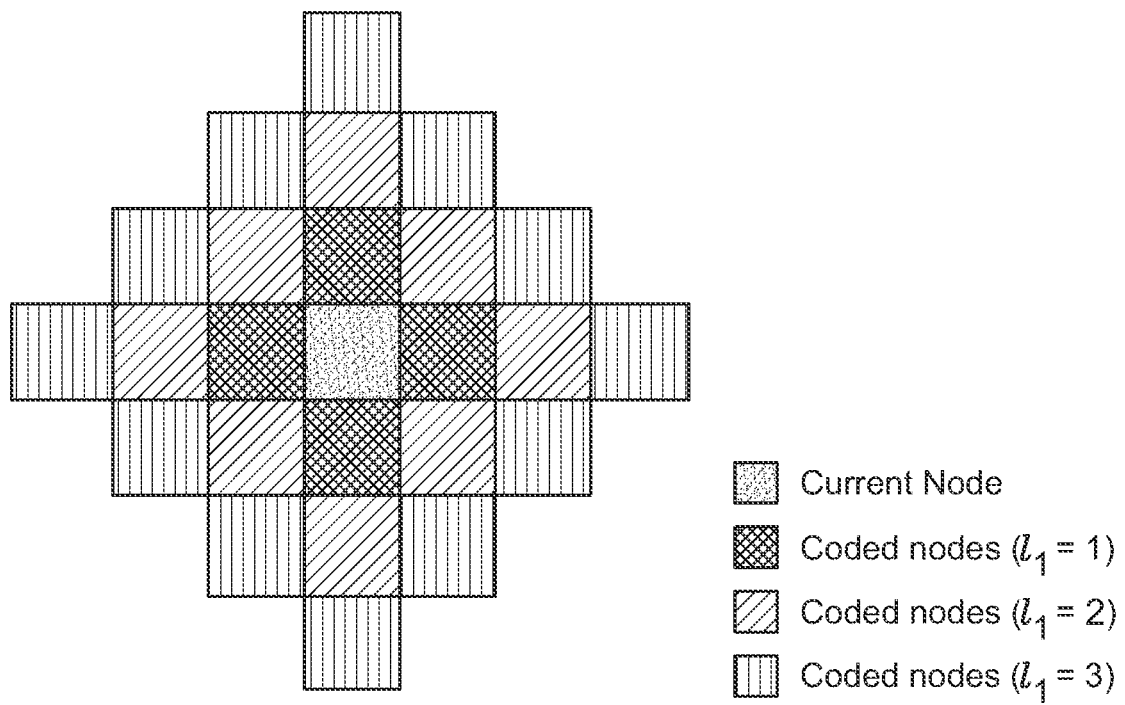
FIG. 4 is an illustration of a classification of neighboring nodes.

According to embodiments when coding the occupancy code of the current node, neighboring coded nodes can be classified by their distance to the current node. 2D illustrations of distance-based classification are shown in FIGS. 3 and 4, where the distance between two nodes are measured by $l_2$ and $l_1$ distances, respectively. The coded nodes that have the same distance to the current node are classified into the same type. Then, different classes can be ordered in terms of the distances, i.e., $C_1, C_2, \ldots, C_K$, where $C_i$ is the group of coded nodes that are the $i^{th}$ closest to current node and K is the number of groups. The context index can be calculated by:

$$ctxIdx = N_1 \cdot (M_2 M_3 \ldots M_K) + N_2 \cdot (M_3 M_4 \ldots M_K) + \ldots + N_K,$$

where $N_i$ indicates the number of occupied nodes in group i, and $M_i$ indicates the maximum number of nodes in group i.

Similarly, according to embodiments when coding the occupancy bit of each sub-node, the same method can be applied to obtain the context index for each child node, i.e., ctxIdxChild. Then the occupancy code of a current node can be coded by entropy coding based on the derived ctxIdx and ctxIdxChild. For example, the final context index, i.e., idx, can be obtained by a look-up table LUT as follows, idx=LUT[ctxIdx][ctxIdxChild].

In another embodiment, a technique is used wherein a threshold $T_i$ is defined for each $C_i$. If $N_i \geq T_i$, a positive bias score is added as follows, $$\text{score} = \sum_i I(N_i \geq T_i).$$

where $$I(b) = \begin{cases} w_0 & \text{if } b \text{ is false} \\ w_1 & \text{if } b \text{ is true} \end{cases}.$$

The final score is utilized as the context index of current node.

Figure 5:
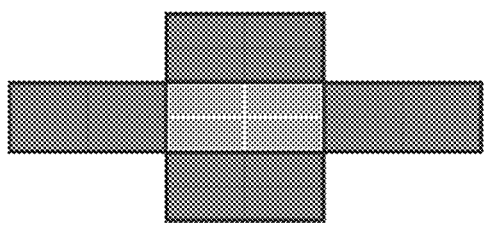
FIG. 5 is an illustration of neighboring nodes of non-cubic nodes.

According to embodiments, if flexible tree partitions are allowed, where symmetric and asymmetric octree, quad-tree and binary-tree partitions are enabled, a current node may not be a cubic and may have different sizes in some dimensions. In these cases, the neighboring nodes of a current node are defined as the neighboring coded nodes that have the same size of current node, as illustrated in 2D in FIG. 5. In the distance-based context modeling, the distance orders of neighboring nodes can be changed accordingly. For example, in FIG. 5, the two vertically neighboring nodes are closer than the two horizontally neighboring nodes to the center node.

According to embodiments, if the depth-first traversal order is applied, only partial neighboring nodes of a current node and partial neighboring nodes of the parent node of the current node are coded before the current node, thus only partial context information is available for the context modeling of current node. However, for those coded neighboring nodes, the complete occupancy information from the current partition depth to the leaf nodes is available for context modeling of current node.

Figure 6:
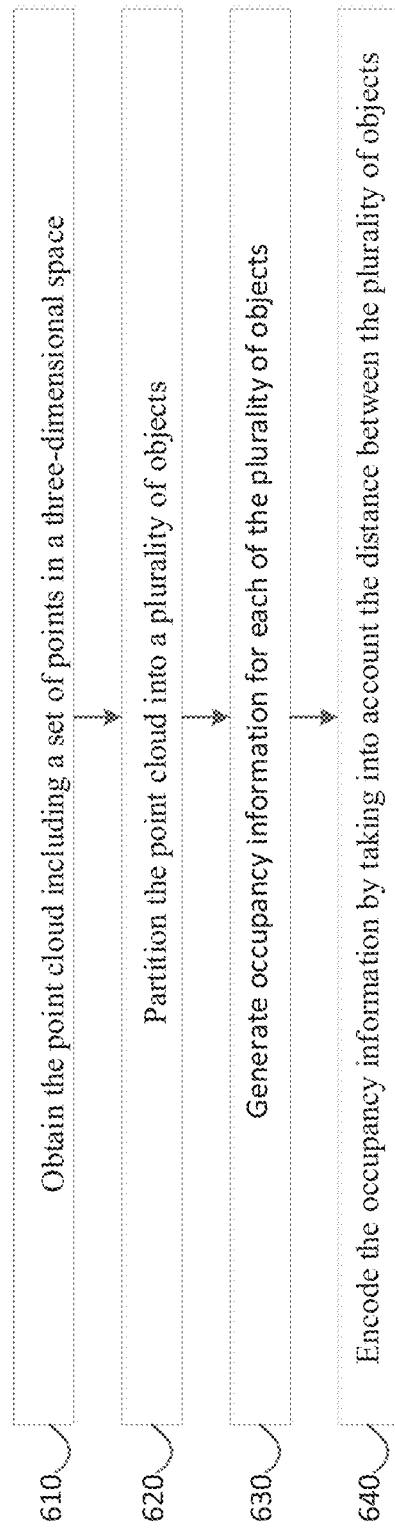
FIG. 6 is a flowchart of an example process for coding information of a point cloud.

FIG. 6 is a flow chart of an example process 600 for coding information of a point cloud. In some implementations, one or more process blocks of FIG. 6 may be performed by user device 710. In some implementations, one or more process blocks of FIG. 6 may be performed by another device or a group of devices separate from or including user device 710, such as platform 720.

As shown in FIG. 6, process 600 may include obtaining the point cloud including a set of points in a three-dimensional space (block 610).

The point cloud may be a set of points in a 3D space, each with associated attributes, e.g. color, material properties, etc.

As further shown in FIG. 6, process 600 may include partitioning the point cloud into a plurality of objects (block 620), generating occupancy information for each of the plurality of objects (block 630), and encoding the occupancy information by taking into account the distance between the plurality of objects (block 640).

Figure 7:
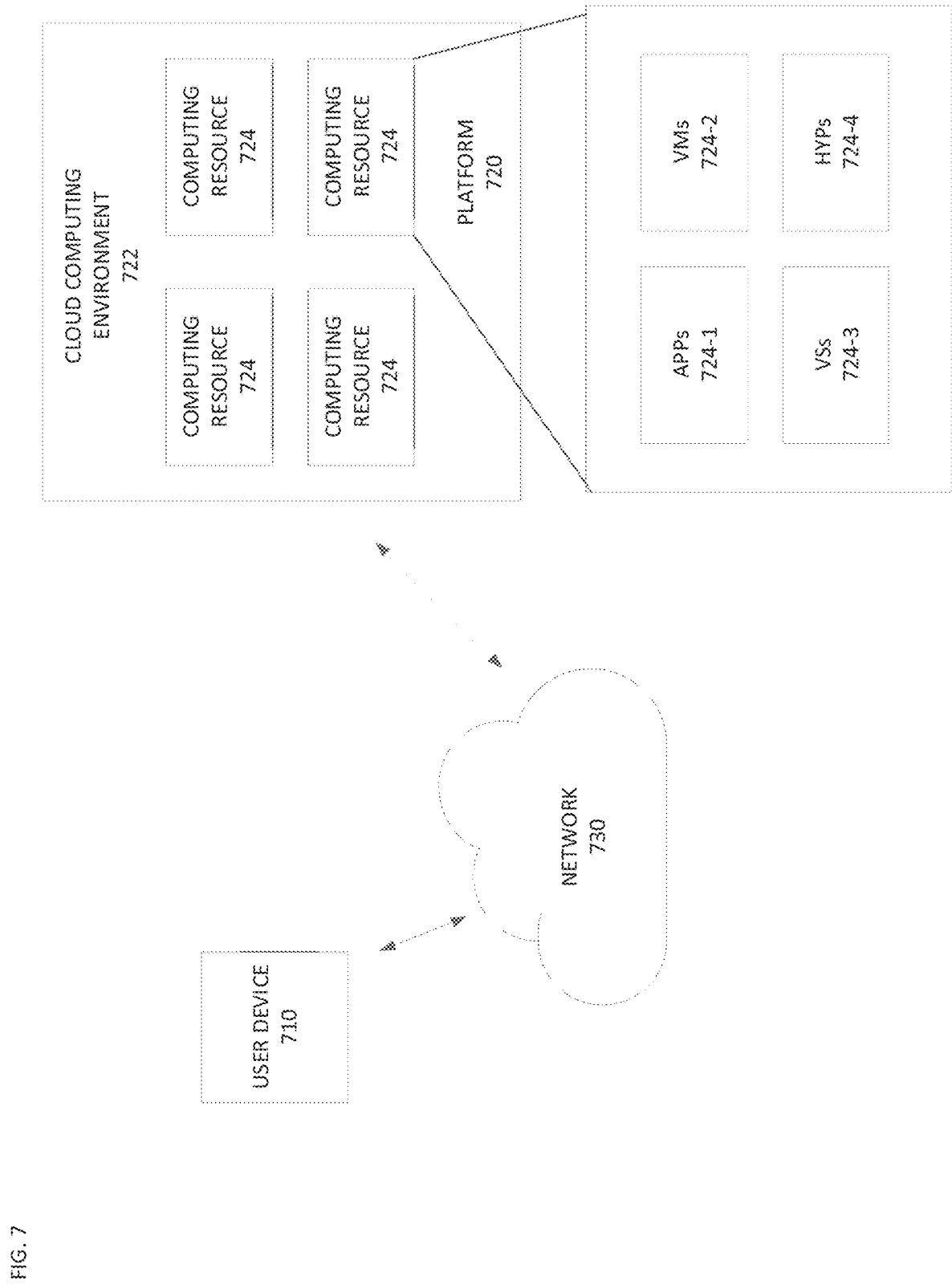
FIG. 7 is a diagram of an example environment in which systems and/or methods, described herein, may be implemented.

FIG. 7 is a diagram of an example communication system 700 in which systems and/or methods, described herein, may be implemented. As shown in FIG. 7, communication system 700 may include a user device 710, a platform 720, and a network 730. Devices of communication system 700 may interconnect via wired connections, wireless connections, or a combination of wired and wireless connections.

The communication system 700 may support unidirectional transmission of data. For example, a first user device 710 may code video data at a local location for transmission to a second user device 710 via the network 730. The second user device 710 may receive the coded video data of the first user device 710 from the network 730, decode the coded data and display the recovered video data. Unidirectional data transmission may be common in media serving applications, and the like.

The communication system 700 may support bidirectional transmission of data. For example, the communication system 700 may support bidirectional transmission of coded video that may occur, for example, during videoconferencing. For bidirectional transmission of data, each user device 710 may code video data captured at a local location for transmission to the other user device 710 via the network 730. Each user device 710 also may receive the coded video data transmitted by the other user device 710, may decode the coded data and may display the recovered video data at a local display device.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of providing information to user device 710, as described elsewhere herein. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 is not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc. services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for coding information of a point cloud, the method performed by at least one processor and comprising:
    obtaining the point cloud including a set of points in a three-dimensional space;
    partitioning the point cloud into a plurality of objects and generating occupancy information for each of the plurality of objects; and
    encoding the occupancy information by taking into account a distance between the plurality of objects,
    wherein the occupancy information is encoded using a context index defined by a look-up-table using the formula: LUT{ctxIdx}{ctxIdxChild}, wherein LUT is the look-up-table, ctxIdx is a node of the plurality of objects, and ctxIdxChild is a sub-node of the plurality of objects.

2. The method of claim 1, wherein the encoding of the occupancy information is performed on an object-by-object basis such that a next piece of occupancy information to be encoded is encoded based on a classification of surrounding objects of the plurality of objects, which are classified based on the distance between the plurality of objects.

3. The method of claim 1, wherein the partitioning of the point cloud uses flexible tree partitioning.

4. The method of claim 3, wherein the plurality of objects includes objects of different sizes.

5. The method of claim 1, wherein the partitioning of the point cloud uses a depth-first partitioning scheme.

6. The method of claim 4, wherein the encoding of the occupancy information takes into account the different sizes of the objects of the plurality of objects.

7. The method of claim 1, wherein the encoding of the occupancy information is performed on an object-by-object basis such that a next piece of occupancy information to be encoded is encoded based on a classification of surrounding objects, of the plurality of objects, which are already encoded, and which are classified based on the distance between the plurality of objects.

8. The method of claim 1, wherein the encoding of the occupancy information is performed on an object-by-object basis such that a next piece of occupancy information to be encoded is encoded based on a classification of surrounding objects, of the plurality of objects, at least some of which have been already encoded or partially encoded, and which are classified based on the distance between the plurality of objects.

9. An apparatus for coding information of a point cloud, the apparatus comprising:
    at least one memory configured to store program code; and at least one processor configured to access the at least one memory and operate according to the program code, the program code comprising:

obtaining code configured to obtain the point cloud including a set of points in a three-dimensional space;

partitioning code configured to partition the point cloud into a plurality of objects and generate occupancy information for each of the plurality of objects; and encoding code configured to encode the occupancy information by taking into account a distance between the plurality of objects, wherein the encoding code is configured to encode the occupancy information using a context index defined by a look-up-table using the formula: LUT{ctxIdx}{ctxIdxChild}, wherein LUT is the look-up-table ctxIdx is a node of the plurality of objects, and ctxIdxChild is a sub-node of the plurality of objects.

10. The apparatus of claim 9, wherein the encoding code is configured to encode the occupancy information on an object-by-object basis such that a next piece of occupancy information to be encoded is encoded based on a classification of surrounding objects of the plurality of objects, which are classified based on the distance between the plurality of objects.

11. The apparatus of claim 9, wherein the partitioning code is configured to partition the point cloud using flexible tree partitioning.

12. The apparatus of claim 11, wherein the plurality of objects includes objects of different sizes.

13. The apparatus of claim 9, wherein the partitioning code is configured to partition the point cloud using a depth-first partitioning scheme.

14. The apparatus of claim 12, wherein the encoding code is configured to encode the occupancy information by taking into account the different sizes of the objects of the plurality of objects.

15. The apparatus of claim 9, wherein the encoding code is configured to encode the occupancy information on an object-by-object basis such that a next piece of occupancy information to be encoded is encoded based on a classification of surrounding objects, of the plurality of objects, which are already encoded, and which are classified based on the distance between the plurality of objects.

16. A non-transitory computer-readable storage medium storing instructions that cause at least one processor to:

obtain a point cloud including a set of points in a three-dimensional space;

partition the point cloud into a plurality of objects and generating occupancy information for each of the plurality of objects; and encode the occupancy information by taking into account a distance between the plurality of objects wherein the occupancy information is encoded using a context index defined by a look-up-table using the formula: LUT{ctxIdx} {ctxIdxChild}, wherein LUT is the look-up-table, ctxIdx is a node of the plurality of objects, and ctxIdxChild is a sub-node of the plurality of objects.

* * * * *